United States Patent
Yeh (10) Patent No.: US 8,386,697 B2
(45) Date of Patent: Feb. 26, 2013

(54) MEMORY MANAGING METHOD FOR NON-VOLATILE MEMORY AND CONTROLLER USING THE SAME

(75) Inventor: Chih-Kang Yeh, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 867 days.

(21) Appl. No.: 12/230,970

(22) Filed: Sep. 9, 2008

(65) Prior Publication Data

US 2010/0064094 A1 Mar. 11, 2010

(51) Int. Cl.
*G06F 13/00* (2006.01)
(52) U.S. Cl. ...................................... 711/103
(58) Field of Classification Search .................. None
See application file for complete search history.

(56) References Cited

U.S. PATENT DOCUMENTS 7,441,067 B2 * 10/2008 Gorobets et al. ............... 711/103
2007/0294490 A1 * 12/2007 Freitas et al. .................. 711/154

\* cited by examiner

*Primary Examiner* — Kevin Verbrugge
*Assistant Examiner* — Stella Eun
(74) *Attorney, Agent, or Firm* — Bacon & Thomas, PLLC (57) ABSTRACT

A memory managing method for a non-volatile memory and a controller using the same are disclosed. The controller includes a system wear leveling member for performing a first wear leveling process in a non-volatile memory for choosing a memory unit; and a subsystem wear leveling member for performing a second wear leveling process in the chosen memory unit for selecting a block from the chosen memory unit for data programming; whereby uneven use of the blocks of the chosen memory unit is avoided.

25 Claims, 6 Drawing Sheets

MEMORY MANAGING METHOD FOR NON-VOLATILE MEMORY AND CONTROLLER USING THE SAME

FIELD OF THE INVENTION

The present invention relates to a memory managing method, and more particularly, to a subsystem wear leveling method for a non-volatile memory and a controller using the same.

BACKGROUND OF THE INVENTION

The use of non-volatile memory systems such as flash memory storage systems is increasing due to the compact physical size of such memory systems and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller. Typically, a flash memory chip set may be arranged to be assembled into an embedded system. The manufacturers of such assemblies or host systems typically acquire flash memory in component-form, as well as other components, and then assemble the flash memory and the other components into a host system.

Although non-volatile memory or, more specifically, flash memory storage blocks within flash memory systems may be repetitively programmed and erased, each block or physical location may only be erased a certain number of times before the block wears out, i.e., before memory capacity begins to become smaller. That is, each block has a program and erase cycle limit. In some memories, a block may be erased up to approximately ten thousand times before the block is considered to be unusable. In other memories, a block may be erased up to approximately one hundred thousand times or even up to a million times before the block is considered to be worn out. When a block is worn out, thereby causing a loss of use or a significant degradation of performance to a portion of the overall storage volume of the flash memory system, a user of the flash memory system may be adversely affected, as for the example through the loss of programmed data or the inability to program data.

The wear on blocks, or physical locations, within a flash memory system varies depending upon how much each of the blocks is programmed. If a block or, more generally, a storage element, is programmed once, then effectively never reprogrammed, the number of program and erase cycles and, hence, wear associated with that block will generally be relatively low. However, if a block is repetitively written to and erased, e.g., cycled, the wear associated with that block will generally be relatively high. As logical block addresses (LBAs) are used by hosts, e.g., systems which access or use a flash memory system, to access data programmed in a flash memory system, if a host repeatedly uses the same LBAs to write and overwrite data, the same physical locations or blocks within the flash memory system are repeatedly written to and erased, as will be appreciated by those of skill in the art.

When some blocks are effectively worn out while other blocks are relatively unworn, the existence of the worn out blocks generally compromises the overall performance of the flash memory system. In addition to degradation of performance associated with worn out blocks themselves, the overall performance of the flash memory system may be compromised when an insufficient number of blocks which are not worn out are available to program desired data. Often, a flash memory system may be deemed unusable when a critical number worn out blocks are present in the flash memory system, even when many other cells in the flash memory system are relatively unworn. When a flash memory system which includes a substantial number of relatively unworn blocks is considered to be unusable, many resources associated with the flash memory system are effectively wasted.

In order to increase the likelihood that blocks within a flash memory system are worn fairly evenly, wear leveling operations are often performed. Wear leveling operations, as will be understood by those skilled in the art, are generally arranged to allow the physical locations or blocks which are associated with particular LBAs to be changed such that the same LBAs are not always associated with the same physical locations or blocks. By changing the block associations of LBAs, it is less likely that a particular block may wear out well before other blocks wear out.

Recently, non-volatile memories, having data transmitted in a group of blocks at once, are rapidly developing due to the fact that such non-volatile memory has an access speed faster than a traditional non-volatile memory which transmits data one block at a time. In other words, data in such non-volatile memory is accessed in the unit of memory units rather than blocks, and thus the access speed is increased. Hence, data is also erased in the unit of memory units. However, unused blocks of a memory unit may be erased concurrently and uneven use of the blocks of the memory unit may occur. Therefore, a subsystem wear leveling method for a non-volatile memory and a controller using the same are desperately desired so as to prolong a lifespan of the non-volatile memory.

SUMMARY OF THE INVENTION

Accordingly, the prior arts are limited by the above problems. It is an object of the present invention to provide a memory managing method for a non-volatile memory and a controller using the same that can avoid uneven use of blocks of a memory unit.

In accordance with a first aspect of the present invention, a memory managing method for a non-volatile memory having a first plurality of blocks, including the steps of: (a) grouping the first plurality of blocks into a second plurality of memory units; (b) writing data to at least a block of one of the second plurality of memory units; (c) increasing a counting value of the one memory unit after all the blocks of the one memory unit are written; and (d) performing a wear leveling process in the non-volatile memory according to the counting value of each of the memory units.

Preferably, the memory managing method further includes a step of marking the written block between steps (b) and (c).

Preferably, the written block is marked in a reference table for indicating use of the written block.

Preferably, the marks of the written block of the one memory unit are deleted from the reference table after all the blocks of the one memory unit are written.

Preferably, the counting value of the one memory unit increases by a default number after the marks of the written block are deleted.

Preferably, the counting value represents an accumulated value of erasure times of the memory unit.

Preferably, the memory managing method further includes a step of selecting a non-marked block and writing another data to the selected non-marked block between steps (b) and (c).

Preferably, step (d) includes: (d1) calculating the counting value of each of the memory units; (d2) locating empty memory units among the memory units; and (d3) choosing a memory unit among the empty memory units having a least counting value.

Certainly, the memory managing method further includes between steps (a) and (b) steps of: (a1) choosing a memory unit among the second plurality of memory units; and (a2) selecting at least a block among the chosen memory unit.

Preferably, the chosen memory unit is chosen randomly, sequentially, or via the wear leveling process.

Preferably, the selected block is selected randomly or sequentially.

Preferably, a size of the data is smaller than a size of the memory unit.

Preferably, the data includes temporary objects, tables, mapping files or data has a size smaller than a size of a memory unit.

Preferably, the non-volatile memory includes multiple data buses.

In accordance with a second aspect of the present invention, a controller for a non-volatile memory having a first plurality of blocks, the first plurality of blocks being grouped into a second plurality of memory units, the controller including a microprocessor for programming and erasing data in the selected block; a calculating unit, coupled to the microprocessor and used for calculating a counting value of each of the second plurality of memory units; and a selector, coupled to the microprocessor and used for choosing a memory unit having an empty memory space with a least counting value, and for selecting at least one block from the chosen memory unit.

Preferably, the selector includes a subsystem wear leveling member for performing a first wear leveling process in one of the second plurality of memory units for selecting at least one block from the one memory unit; and a system wear leveling member for performing a second wear leveling process in the non-volatile memory for choosing a memory unit for data programming.

Preferably, the controller further includes a buffer memory for programming a reference table; and a mark managing unit for adding a mark in the reference table once the data is programmed in the selected block for indicating use of the block of the chosen memory unit, and for deleting the marks in the reference table while the blocks of the chosen memory unit are all used.

Preferably, the counting value represents an accumulated value of erasure times of each of the memory units. The calculating unit increments the counting value of the chosen memory unit by a default number once the marks of the blocks of the chosen memory unit are deleted by the mark managing unit.

Preferably, the selected block is a non-marked block. The selector sequentially or randomly selects the block from the chosen memory unit.

In accordance with a third aspect of the present invention, a data programming system, including multiple memory modules, each having a plurality of blocks, respective blocks of the memory modules being grouped into respective memory units; and a controller for controlling the plurality of memory modules, including a calculating unit for calculating a counting value of each of the memory units; a selector for choosing a memory unit having an empty memory space with a least counting value, and for selecting at least one block from the chosen memory unit; and a microprocessor for programming and erasing data in the selected block; whereby uneven use of the blocks of the chosen memory unit is avoided.

Preferably, the controller further includes a buffer memory for programming a reference table; and a mark managing unit for adding a mark in the reference table once the data is programmed in the selected block for indicating use of the block of the chosen memory unit, and for deleting the marks in the reference table while the blocks of the chosen memory unit are all used.

In accordance with a fourth aspect of the present invention, a memory managing method for a non-volatile memory having a first plurality of blocks, including the steps of: (a) grouping the first plurality of blocks into a second plurality of memory units; (b) calculating a first counting value of each of the memory units; (c) locating empty memory units among the memory units; (d) calculating a second counting value of each of the blocks of the memory units; (e) choosing a memory unit among the empty memory units having a least first counting value; (f) selecting a block from the chosen memory unit having a least second counting value; and (g) programming a data into the selected block; whereby uneven use of the blocks of the chosen memory unit is avoided.

Preferably, the first counting value and the second counting value represent an accumulated value of erasure times of each of the memory units and an accumulated value of erasure times of each of the blocks, respectively.

In accordance with a fifth aspect of the present invention, a controller for a non-volatile memory having a first plurality of blocks, the first plurality of blocks being grouped into a second plurality of memory units, the controller including a calculating unit for calculating a first counting value of each of the memory units and a second counting value of each of the blocks of the memory units; a selector for choosing a memory unit having an empty memory space with a least first counting value, and for selecting a block from the chosen memory unit having a least second counting value; and a microprocessor for programming and erasing data in the selected block; whereby uneven use of the blocks of the chosen memory unit is avoided.

In accordance with a sixth aspect of the present invention, a data programming system, including multiple memory modules, each having a plurality of blocks, respective blocks of the memory modules being grouped into respective memory units; and a controller for controlling the plurality of memory modules, including a calculating unit for calculating a first counting value of each of the memory units and a second counting value of each of the blocks of the memory units; a selector for choosing a memory unit having an empty memory space with a least first counting value, and for selecting a block from the chosen memory unit having a least second counting value; and a microprocessor for programming and erasing data in the selected block; whereby uneven use of the blocks of the chosen memory unit is avoided.

BRIEF DESCRIPTION OF THE DRAWING

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiment. It is to be noted that the following descriptions of preferred embodiment of this invention are presented herein for purpose of illustration and description only; it is not intended to be exhaustive or to be limited to the precise form disclosed.

Figure 1:
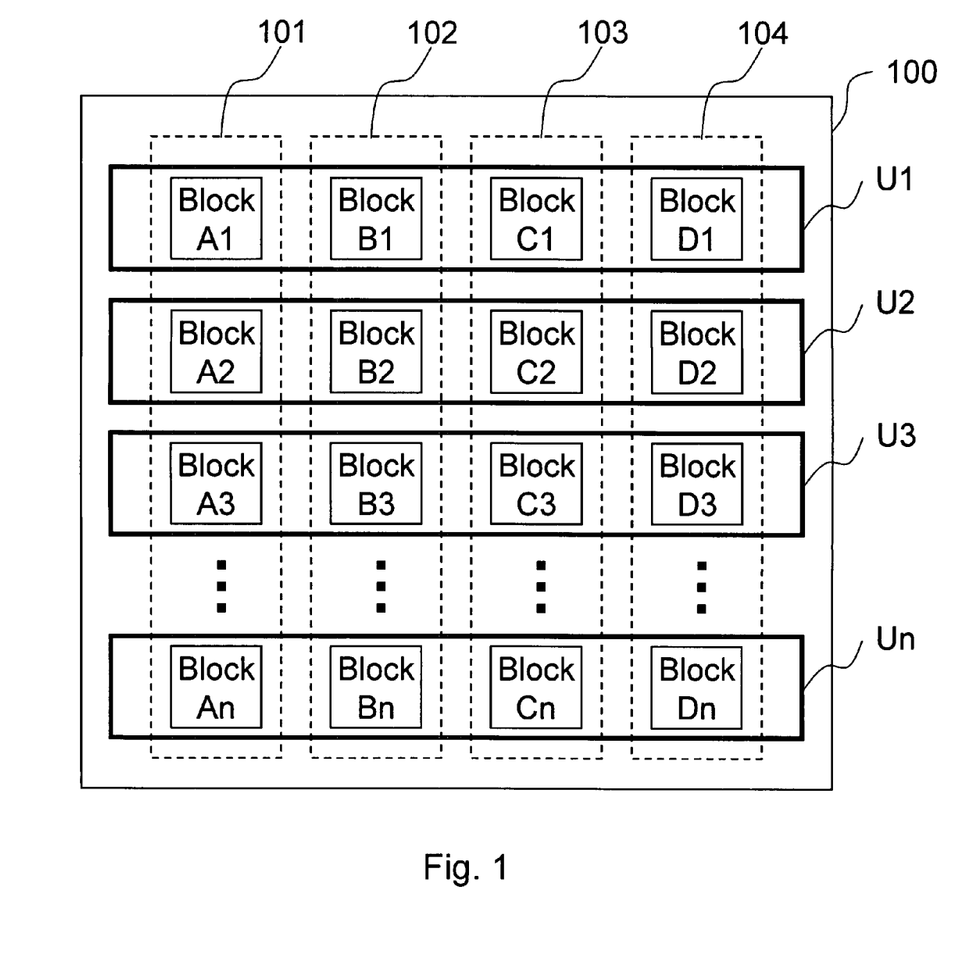
FIG. 1 is a schematic diagram of a four-channel non-volatile memory.

In the present invention, a four-channel non-volatile memory is introduced to perform the present invention, wherein the number of channels is equal to the number of data buses. However, it should be understood that a single-channel non-volatile memory, having multiple blocks grouped into units, may also be applied in the present invention. FIG. 1 is a schematic diagram of a four-channel non-volatile memory. As shown in FIG. 1, a four-channel non-volatile memory 100 has four memory modules 101, 102, 103, and 104, and each of the memory modules has n blocks, n is an integer. For example, memory module 101 includes blocks A1~An, memory module 102 includes blocks B1~Bn, memory module 103 includes blocks C1~Cn, and memory module 104 includes blocks D1~Dn. For the purpose of accelerating the data access speed of the four-channel non-volatile memory 100, making blocks management easier or decreasing mapping table capacity. Respective blocks in the memory modules 101, 102, 103, and 104 are grouped into respective memory units U1~Un. For instance, block A1, block B1, block C1, and block D1 are grouped into memory unit U1. In other words, the four-channel non-volatile memory 100 has n memory units U1~Un.

Furthermore, to effectively program (i.e. write and erase) the non-volatile memory 100, respective blocks A1~An, B1~Bn, C1~Cn, and D1~Dn in the memory modules 101, 102, 103, and 104, may be logically grouped into a system area, a data area and a spare area. That is to say, the non-volatile memory 100 has a system area, a data area and a spare area, respectively, in each memory module. Generally, the data area may occupy 90% area of the memory module.

The system area records system data, such as area number of the memory module; block number within each area; page number within each block; and a logical/physical mapping table, etc. The data area stores user data. The spare area provides substitute empty blocks for replacing the blocks of the data area. More particularly, if a new data is about to be written to the location of the existing data, erasing of the existing data has to be performed first.

Due to the fact that a memory unit is the management unit in a mapping table, within the data area of the memory unit, that are still effective may be copied to another memory unit within the spare area before the original memory unit is about to be erased. For example, when a new data is about to be written to a memory unit U1 which is written with data within the data area, another memory unit U2 is generally selected from the spare area, and then effective data written on the memory unit U1 is copied to the memory unit U2 and the new data is written on the memory unit U2. Next, the memory unit U1 is erased and moved to the spare area for future use. Meanwhile, the memory unit U2 is moved to the data area. In other words, the memory unit U1 is logically associated with the spare area, and the memory unit U2 is logically associated with the data area. It should be understood by those skilled in the art that logical relationships of the memory units within the data area may be maintained by the logical/physical mapping table. Furthermore, each block in a memory unit has the same logical unit number. That is to say, block A1, block B1, block C1, and block D1 in memory unit U1 all have the same logical unit number.

Figure 2:
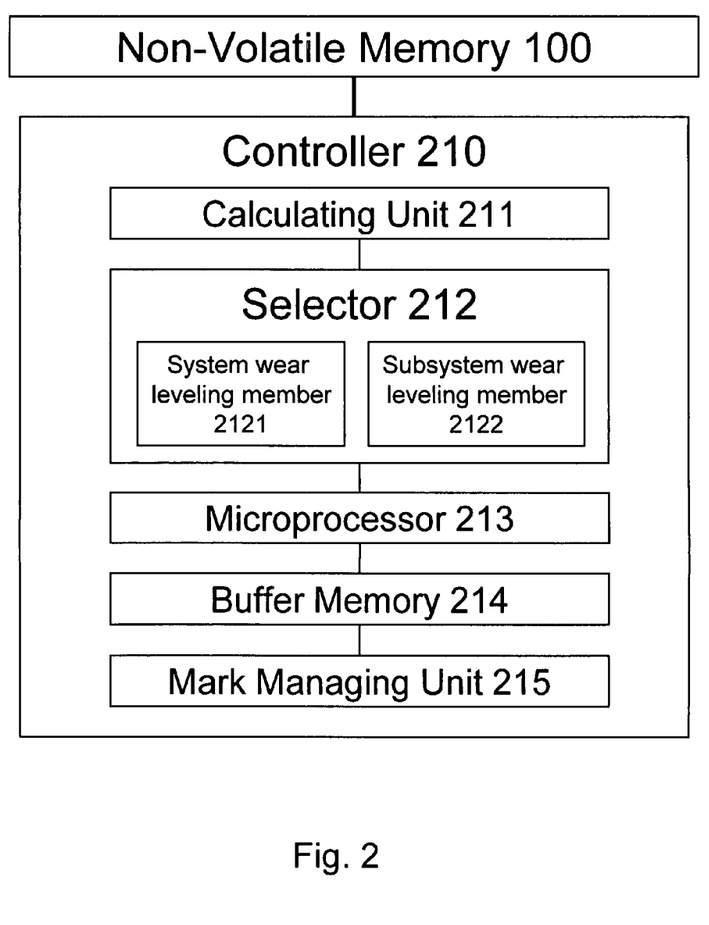
FIG. 2 is a block diagram of a data programming system according to the present invention.

Please refer to FIG. 2. FIG. 2 is a block diagram of a data programming system according to the present invention. The data programming system contains the four-channel non-volatile memory 100 and a controller 210. The controller 210 is used for controlling operation of the four-channel non-volatile memory 100, such as programming, reading, erasing of data, etc. The controller 210 includes a calculating unit 211, a selector 212, a microprocessor 213, a buffer memory 214, and a mark managing unit 215. The calculating unit 211, the selector 212, and the mark managing unit 214 can be executed through hardware or firmware programmed in a memory block (not shown) in the controller 210 or in the non-volatile memory 100. The microprocessor 213 programs and erases data in the blocks.

The selector 212 includes a system wear leveling member 2121 and. The system wear leveling member 2121 performs a first wear leveling process in the four-channel non-volatile memory 100 for choosing a memory unit from a spare area instead of a data area. In another embodiment, the selector 212 further includes a subsystem wear leveling member 2122, the subsystem wear leveling member 2122 performs a second wear leveling process in the chosen memory unit or check the mark marked via a mark managing unit 215 stored in the reference table for selecting at least one block from the chosen memory unit for data programming.

Briefly speaking, the aforementioned first wear leveling process includes the following steps: (a) calculating a first counting value of each of the memory units U1~Un, wherein the first counting value representing an accumulated value of erasure times of each of the memory units U1~Un; (b) locating empty memory units among the memory units U1~Un; and (c) choosing a memory unit among the empty memory units having a least first counting value. In another embodiment, the first counting value comprises one of erasure times, utilization sequence, corrected bit number of the ECC (Error Correction Code), reading times, utilization time and idle time of each of the memory units U1~Un.

The second wear leveling process includes the following steps: (a) calculating a second counting value of each of the blocks, with the second counting value representing an accumulated value of erasure times of each of the blocks in the four-channel non-volatile memory 100; (b) locating empty blocks among the blocks of the chosen memory unit; and (c) selecting at least a block among the empty blocks having a least counting value. The amount of blocks being selected is according to a size of a data to be programmed. The data to be programmed which usually contains information such as temporary objects, tables, mapping files or data has a size smaller than a size of a memory unit has a size smaller than a size of a memory unit. In another embodiment, the second counting value comprises one of erasure times, utilization sequence, corrected bit number of the ECC (Error Correction Code), reading times, utilization time and idle time of each of the blocks in the four-channel non-volatile memory 100

The calculating unit 211 calculates a first counting value which represents an accumulated value of erasure times, utilization sequence, corrected bit number of the ECC (Error Correction Code), reading times, utilization time or idle time or a combination of at least parts of the abovementioned accumulated value of each of the memory units U1~Un. In another embodiment, the calculating unit 211 further calculates a second counting value which represents an accumulated value of erasure times, utilization sequence, corrected bit number of the ECC (Error Correction Code), reading times, utilization time or idle time or a combination of at least parts of the abovementioned accumulated value of each of the blocks in the four-channel non-volatile memory 100.

Therefore, the aforementioned memory unit can be chosen from the spare area randomly, sequentially, or according to the first counting value. Similarly, the blocks can be selected from the chosen memory unit randomly, sequentially, or according to the second counting value. If a memory unit is chosen according to the first counting value, then the chosen memory unit will be the one that has an empty memory space with a least first counting value. Likewise, if a block is selected according to the second counting value, then the selected block will be the one that has an empty memory space with a least second counting value.

The amount of blocks to be selected depends on a size of a data to be programmed. In the present invention, the data to be programmed which usually contains information such as temporary objects, tables, mapping files or data has a size smaller than a size of a memory unit.

The buffer memory 214 of the controller 210 is used for the four-channel non-volatile memory 100 to temporarily program system data, such as a reference table or a mapping table. The buffer memory 214 is a static random access memory (SRAM). However, the present invention is not limited thereto. It should be understood that a dynamic random access memory (DRAM), a magnetic random access memory (MRAM), a phase-change random access memory (PRAM) or other suitable memories may also be applied in the present invention.

In the present embodiment, the mark managing unit 215 adds a mark in the reference table once the data is programmed in the selected block for indicating use of the block of the chosen memory unit, and deletes the marks in the reference table while the blocks of the chosen memory unit are all used. After the mark managing unit 215 deletes the marks in the reference table, the calculating unit 211 increases the first counting value of the chosen memory unit by a default number. Furthermore, the mark could be added not only in the reference table but also in a redundancy area in a block. The calculating unit 211 further increases the second counting value of the selected block by a default number every time when the data programmed in the selected block is erased.

As aforementioned, the selector 212 chooses a memory unit that has an empty memory space with a least first counting value among the memory units U1~Un, then selects at least a block that has an empty memory space with a least second counting value among the chosen memory unit. Besides, the selector 212 selects a block among the chosen memory unit that is not marked in the reference table. In another embodiment, the selector 212 chooses a memory unit that has an empty memory space with a least first counting value among the memory units U1~Un, then directly selects a block among the chosen memory unit that is not marked in the reference table.

In the exemplary embodiment, the system wear leveling member 2121 does not perform the first wear leveling process every time when a data is to be programmed. The first wear leveling process is activated only when the first counting value reaches a first predetermined value. Hence, a memory unit is chosen randomly or sequentially by the selector 212 before the first counting value reaches the first predetermined value. In another embodiment, the system wear leveling member 2121 performs the first wear leveling process every time when a data is to be programmed.

Similarly, in the exemplary embodiment, the subsystem wear leveling member 2122 does not perform the second wear leveling process every time when a data is to be programmed. The second wear leveling process is activated only when the second counting value reaches a second predetermined value. Hence, a block is selected randomly or sequentially by the selector 212 before the second counting value reaches the second predetermined value. Differently, a block is selected based on whether the block to be used is a non-marked block in spite of the selection approaches. In another embodiment, the system wear leveling member 2122 performs the second wear leveling process every time when a data is to be programmed.

The four-channel non-volatile memory 100 is a flash memory. More particularly, the four-channel non-volatile memory 100 is a multi-level cell (MLC) NAND flash memory. However, the present invention is not limited thereto. The four-channel non-volatile memory 100 may also be a single-level cell (SLC) NAND flash memory.

Figure 3A:
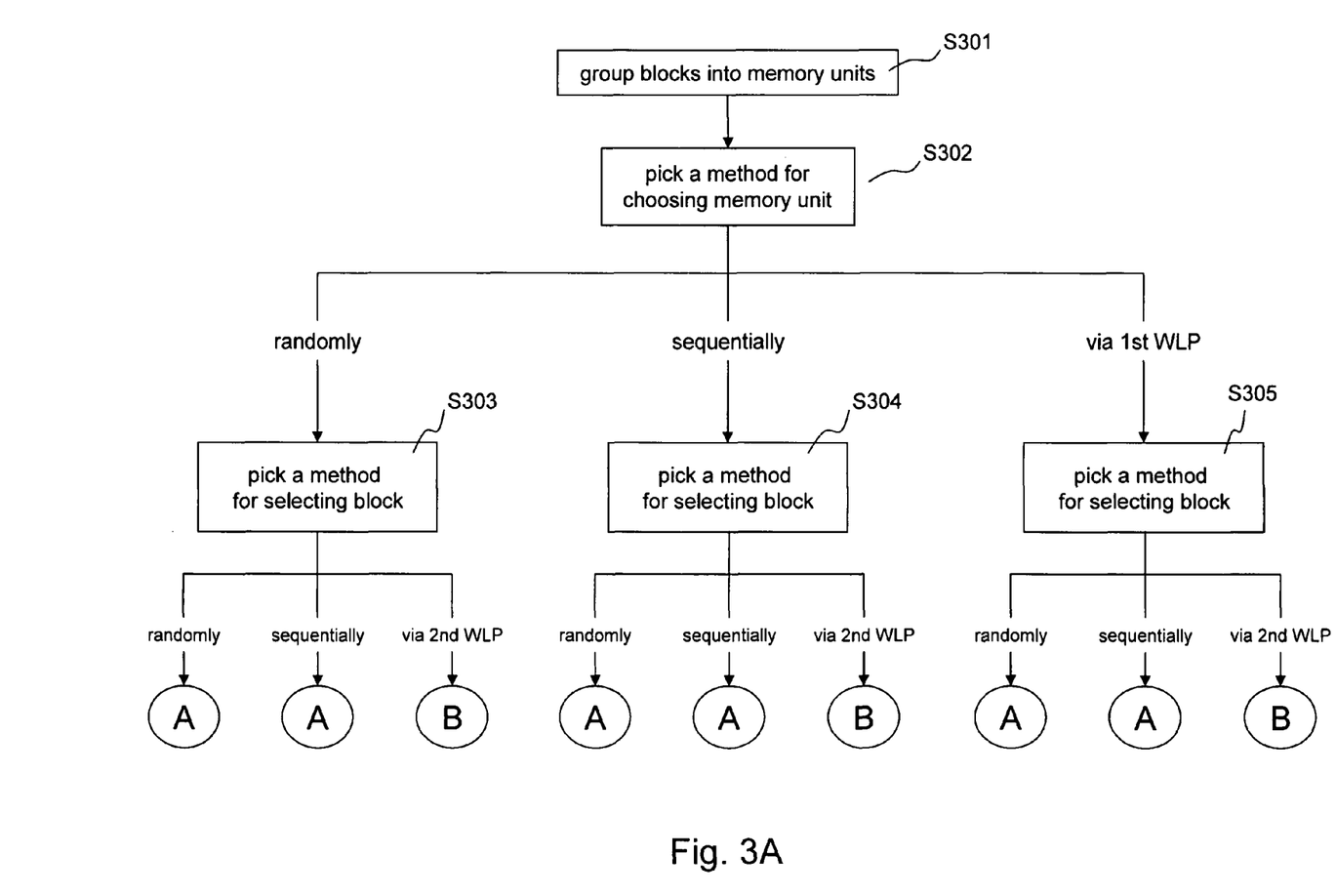
FIGS. 3A-3C show a flow chart of a non-volatile memory managing method according to the present invention.
Figure 3B:
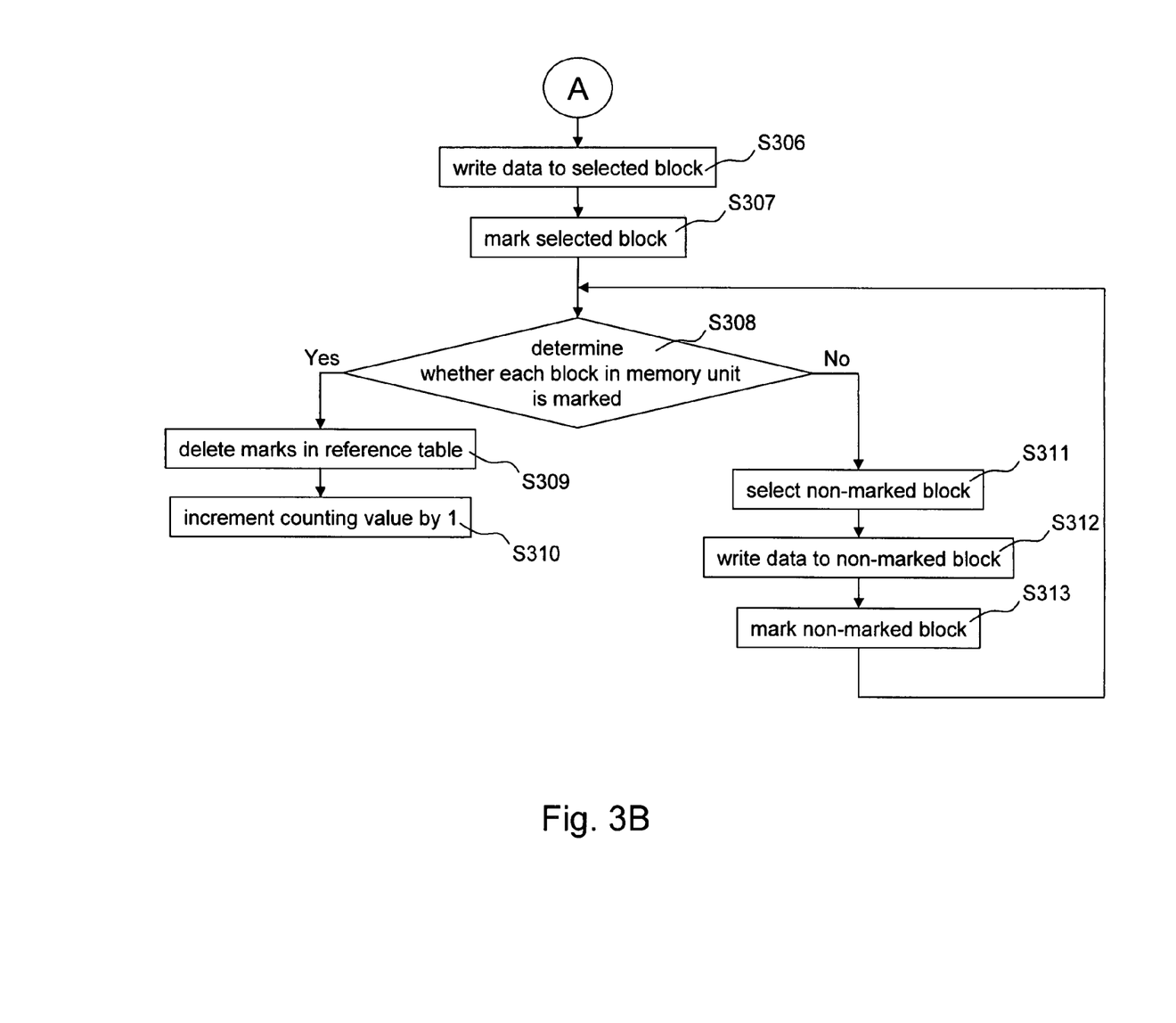
Figure 3C:
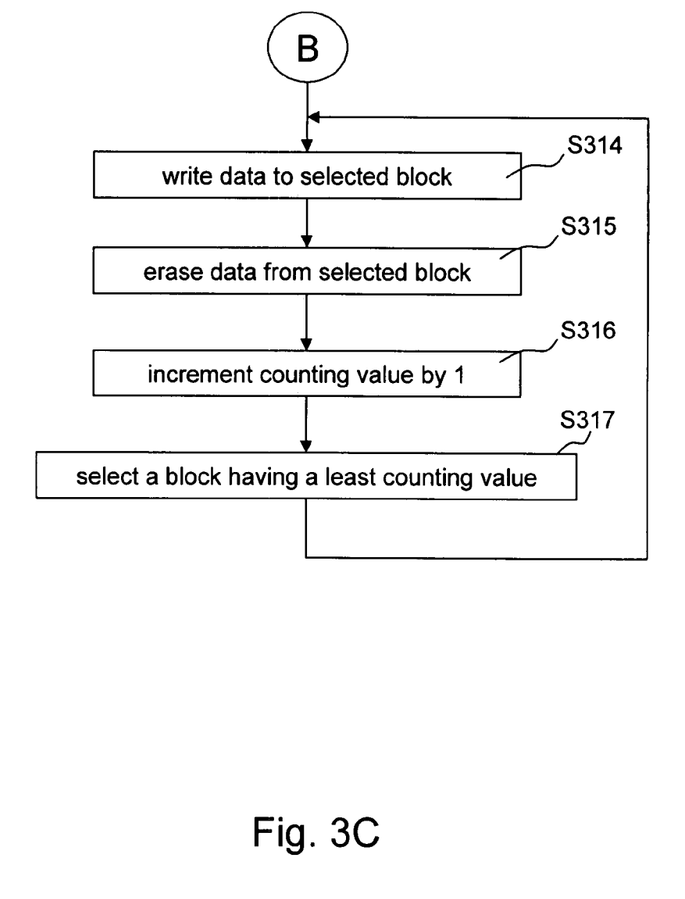
Figure 4:
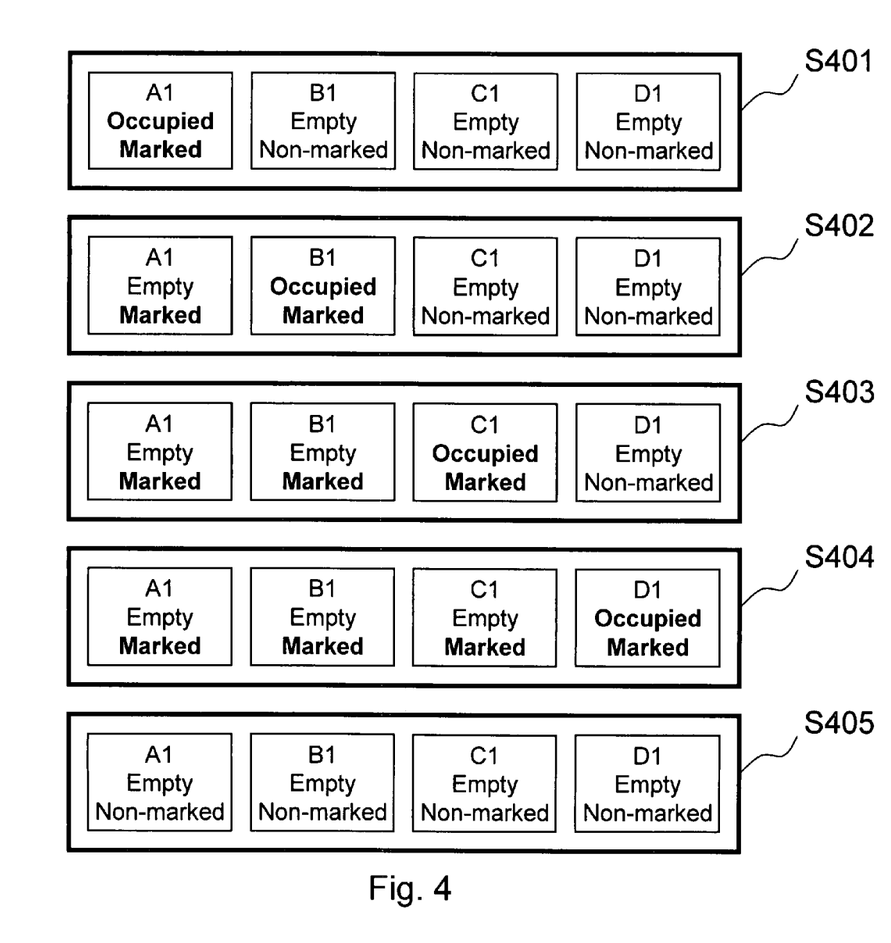
FIG. 4 is a schematic diagram of a reference table showing a status of a memory unit according to the present invention.

Please refer to FIGS. 3A-3C and 4. FIGS. 3A-3C show a flow chart of a non-volatile memory managing method according to the present invention and FIG. 4 is a schematic diagram of a reference table showing a status of a memory unit U1 according to the present invention. As mentioned above, respective blocks in the four memory modules 101, 102, 103, and 104 are grouped into respective memory units U1~Un so as to accelerate the data access of the four-channel non-volatile memory 100, as shown at step S301. Then, a memory unit, e.g. memory unit U1, among the memory units U1~Un is chosen from a spare area by the selector 212 randomly, sequentially, or via a first wear leveling process (WLP), as shown at step S302. Later, at least a block among the chosen memory unit U1 is selected by the selector 212 randomly, sequentially, or via a second wear leveling process (WLP), as shown at steps S303-S305. FIG. 4 shows a schematic diagram of a reference table of a memory unit U1 while the block is selected sequentially.

If the block is selected either sequentially or randomly, once a block is selected, data will be written to the selected block, as shown at step S306, and a mark will be added in the reference table by the mark managing unit 215 for indicating use of the selected block, as shown at step S307. The selected block will not be selected again for any further data programming unless the data is erased from the selected block.

In the meantime, the mark managing unit 215 continuously determines whether each block in the chosen memory unit U1 is marked, as shown at step S308. If each block in the chosen memory unit U1 is marked (i.e. the chosen memory unit U1 is completely used and there are no non-marked blocks contained in the chosen memory unit U1), then the mark managing unit 215 will delete the marks corresponding to the chosen memory unit U1, as shown at step S309. For example, as shown in FIG. 4, the marks corresponding to the chosen memory unit U1 are deleted while block A1, block B1, block C1, and block D1 are all used and marked. After the mark managing unit 215 deletes the marks of the chosen memory unit U1, the first counting value of memory unit U1 will be incremented by a default number, such as one, as shown at step S310.

Contrarily, if the chosen memory unit U1 still contains non-marked blocks after the data is written at step S306, then the non-marked blocks will be free for future use and the marks in the reference table will remain as it is without being deleted. As mentioned above, whenever a data is to be written, a memory unit would be chosen randomly, sequentially, or via a first wear leveling process (WLP), as shown at step S302, and therefore, memory unit U1 may not always be chosen. If the same memory unit at step S302 is being chosen again, then a block is selected based on whether the block to be used is a non-marked block in spite of the selection approaches, as shown at step S311. Later, the data will be written in that non-marked block, as shown at step S312, and another mark would be added in the reference table by the mark managing unit 215 for indicating use of the selected non-marked block, as shown at step S313. After that, the managing method will continue again from step S308. Therefore steps S308-S313 will be repeated continuously.

As shown in FIG. 4, block A1 is selected and marked during step S401. Later, block B1 is selected and marked during step S402 leaving block A1 remain to be marked while data is erased from block A1. Next, block C1 is selected and marked during step S403 leaving blocks A1 and B1 remain to be marked while data is erased from block B1. Finally, after block D1 is selected and marked during step S404 leaving blocks A1, B1, and C1 remain to be marked while data is erased from block C1, the marks in blocks A1, B1, C1, and D1 will be deleted and all become non-marked blocks, as shown in step S405.

Furthermore, in another embodiment, non-marked blocks do not guarantee that they are empty blocks. Non-marked blocks merely mean that they are not yet used to program data having small sizes such as temporary objects, tables, mapping files or data has a size smaller than a size of a memory unit. If a chosen memory unit having marks added in the reference table is occupied by data and is logically associated with a data area, then the mark managing unit 215 will instead add the marks into a memory unit logically associated with a spare area corresponding to the chosen memory unit. Hence, once the data in the chosen memory unit is erased and the chosen memory unit is associated with the spare area, then the chosen memory unit will continue to participate in the programming cycle. In other words, if a non-marked block is logically associated with a memory unit in the data area, then the non-marked block would be selected once the memory unit is logically associated with the spare area. In another embodiment, the reference table could be dynamically stored in the buffer memory 214, a spare area or a data area of non-volatile memory 100 or some of abovementioned places.

Marks are added by the mark managing unit 215 to represent a data is programmed in a block of a memory unit, and the marks are deleted while all of the blocks in the memory unit are marked. That is to say, the marks are deleted in a unit of a memory unit instead of a block. However, it should be noted that the marks can also be separately deleted in a unit of a block in other embodiments.

Furthermore, if the block is selected from the chosen memory unit U1 via a second wear leveling process (WLP) at steps S303-305, then after a block is selected, data will be written to the selected block, as shown at step S314 according to an accumulated value of erasure times, utilization sequence, corrected bit number of the ECC (Error Correction Code), reading times, utilization time or idle time or a combination of at least parts of the abovementioned accumulated value of each of the blocks in the four-channel non-volatile memory 100. Later on, once the written data is erased from the selected block, as shown at step S315, the calculating unit 211 will increment the second counting value of the selected block by a default number, as shown at step S316. Next, whenever another data is to be written, after a memory unit is chosen, the selector 212 will then select a block according to the second counting value. That is to say, the selected block shall be the one having a least second counting value among all of the blocks of the chosen memory unit, as shown at step S317. After that, the managing method will continue again from step S314. Therefore steps S314-S317 will be repeated continuously.

Briefly speaking, the difference between the process flow of selecting a block randomly or sequentially and selecting a block via a second wear leveling process is that the former selects a block according to whether a block is non-marked, whereas the latter selects a block according to whether a block has a least second counting value.

The present invention prevents unused blocks of a memory unit from being erased concurrently and avoids uneven use of the blocks of a memory unit so as to prolong a lifespan of a non-volatile memory.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A memory managing method for a non-volatile memory having at least a first memory module and a second memory module, each of the memory modules has a plurality of blocks, comprising the steps of:
   (a) grouping the plurality of blocks from the first memory module and the second memory module into a second plurality of memory units;
   (b) writing data to at least a block of one of the second plurality of memory units;
   (c) marking the written block; and
   (d) increasing a counting value of the one memory unit after all the blocks of the one memory unit are written;
   wherein the memory unit chosen for data to be written is empty and has a least counting value and the block selected among the chosen memory unit is non-marked.

2. The memory managing method according to claim 1, wherein the written block is marked in a reference table for indicating use of the written block.

3. The memory managing method according to claim 2, wherein the marks of the written block of the one memory unit are deleted from the reference table after all the blocks of the one memory unit are written.

4. The memory managing method according to claim 3, wherein the counting value of the one memory unit increases by a default number after the marks of the written block are deleted.

5. The memory managing method according to claim 1, wherein the counting value represents an accumulated value of erasure times of the memory unit.

6. The memory managing method according to claim 1, wherein a size of the data is smaller than a size of the memory unit.

7. The memory managing method according to claim 1, wherein the data comprises temporary objects, tables, mapping files or data has a size smaller than a size of a memory unit.

8. The memory managing method according to claim 1, wherein the non-volatile memory comprises multiple channels.

9. The memory managing method according to claim 1, wherein the non-volatile memory comprises multiple data buses.

10. A controller for a non-volatile memory having at least a first memory module and a second memory module, each of the memory modules has a plurality of blocks, wherein the plurality of blocks from the first memory module and the second memory module are grouped into a second plurality of memory units, the controller comprising:
- a microprocessor for programming and erasing data in the selected block;
- a calculating unit, coupled to the microprocessor and used for calculating a counting value of each of the second plurality of memory units;
- a selector, coupled to the microprocessor and used for choosing a memory unit having an empty memory space with a least counting value, and for selecting at least one block from the chosen memory unit; and
- a mark managing unit for adding a mark in a reference table once the data is programmed in the selected block for indicating use of the block of the chosen memory unit, and for deleting the marks in the reference table while the blocks of the chosen memory unit are all used;
- wherein the counting value of the chosen memory unit is increased after all the blocks of the chosen memory unit are written.

11. The controller according to claim 10, wherein the selector comprising:
- a subsystem wear leveling member for performing a first wear leveling process in one of the second plurality of memory units for selecting at least one block from the one memory unit; and
- a system wear leveling member for performing a second wear leveling process in the non-volatile memory for choosing a memory unit for data programming.

12. The controller according to claim 10, further comprising a buffer memory for storing the reference table.

13. The controller according to claim 10, wherein the selected block is a non-marked block.

14. The controller according to claim 10, wherein the counting value represents an accumulated value of erasure times of each of the memory units.

15. The controller according to claim 10, wherein the calculating unit increments the counting value of the chosen memory unit by a default number once the marks of the blocks of the chosen memory unit are deleted by the mark managing unit.

16. The controller according to claim 10, wherein the data comprises temporary objects, tables, mapping files or data has a size smaller than a size of a memory unit.

17. The controller according to claim 10, wherein the non-volatile memory comprises multiple data buses.

18. A data programming system, comprising:
- multiple memory modules, each of the memory modules having a plurality of blocks, the plurality of blocks of the memory modules being grouped into a plurality of memory units; and
- a controller for controlling the plurality of memory modules, including:
  - a calculating unit for calculating a counting value of each of the memory units;
  - a selector for choosing a memory unit having an empty memory space with a least counting value, and for selecting at least one block from the chosen memory unit;
  - a microprocessor for programming and erasing data in the selected block; and
  - a mark managing unit for adding a mark in a reference table once the data is programmed in the selected block for indicating use of the block of the chosen memory unit, and for deleting the marks in the reference table while the blocks of the chosen memory unit are all used;
  - whereby uneven use of the blocks of the chosen memory unit is avoided;
  - wherein the counting value of the chosen memory unit is increased after all the blocks of the chosen memory unit are written.

19. The data programming system according to claim 18, wherein the controller further comprises a buffer memory for storing the reference table.

20. A memory managing method for a non-volatile memory having at least a first memory module and a second memory module, wherein each of the memory modules has a plurality of blocks, and each of the memory modules is accessible via a corresponding channel, the method comprising the steps of:
- (a) grouping the first plurality of blocks from the first memory module and the second memory module into a second plurality of memory units;
- (b) calculating a first counting value of each of the memory units;
- (c) locating empty memory units among the memory units;
- (d) calculating a second counting value of each of the blocks of the memory units;
- (e) choosing a memory unit among the empty memory units having a least first counting value;
- (f) selecting a block from the chosen memory unit having a least second counting value; and
- (g) programming a data into the selected block.

21. The memory managing method according to claim 20, wherein the first counting value and the second counting value represent an accumulated value of erasure times of each of the memory units and an accumulated value of erasure times of each of the blocks, respectively.

22. The memory managing method according to claim 20, wherein the data comprises temporary objects, tables, mapping files or data has a size smaller than a size of a memory unit.

23. The memory managing method according to claim 20, wherein a size of the data is smaller than a size of the chosen memory unit.

24. The memory managing method according to claim 20, wherein the non-volatile memory comprises multiple channels.

25. The memory managing method according to claim 20, wherein the non-volatile memory comprises multiple data buses.

* * * * *